(12) United States Patent
Takahashi et al.

(10) Patent No.: US 7,913,962 B2
(45) Date of Patent: Mar. 29, 2011

(54) SUCTION CUP

(75) Inventors: Shunichi Takahashi, Tokyo (JP); Makoto Kawabata, Tokyo (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 11/845,490

(22) Filed: Aug. 27, 2007

(65) Prior Publication Data
US 2008/0048084 A1 Feb. 28, 2008

(30) Foreign Application Priority Data

Aug. 28, 2006 (JP) .................. 2006-230151

(51) Int. Cl.
A45D 42/14 (2006.01)
F16B 47/00 (2006.01)

(52) U.S. Cl. ............... 248/205.5; 248/205.6; 248/205.7; 248/205.8; 248/205.9; 248/206.1; 248/206.2; 248/363

(58) Field of Classification Search .... 248/205.5–206.2, 248/363
See application file for complete search history.

(56) References Cited

U.S. PATENT DOCUMENTS

| | | | | | |
|---|---|---|---|---|---|
| 2,055,397 A | * | 9/1936 | Zaiger | ......................... | 248/206.1 |
| 2,131,224 A | * | 9/1938 | Kaack | ......................... | 248/206.1 |
| 2,871,054 A | * | 1/1959 | Zinke | ......................... | 294/64.1 |
| 5,029,786 A | * | 7/1991 | Wu | ......................... | 248/205.7 |
| 5,133,524 A | * | 7/1992 | Liu | ......................... | 248/205.8 |
| 5,176,346 A | * | 1/1993 | Liu | ......................... | 248/206.1 |
| 5,372,761 A | * | 12/1994 | Anderson, Sr. | ......................... | 264/36.21 |
| 5,711,501 A | * | 1/1998 | Belokin et al. | ......................... | 248/205.9 |
| 6,143,391 A | * | 11/2000 | Barnes et al. | ......................... | 428/99 |
| 6,318,685 B1 | * | 11/2001 | Huber | ......................... | 248/205.5 |
| 7,293,750 B2 | * | 11/2007 | Richter | ......................... | 248/205.5 |
| 7,469,868 B2 | * | 12/2008 | Bury | ......................... | 248/205.8 |
| 2007/0102847 A1 | * | 5/2007 | Ilda et al. | ......................... | 264/328.1 |
| 2007/0246621 A1 | * | 10/2007 | Akai et al. | ......................... | 248/205.5 |
| 2008/0048083 A1 | * | 2/2008 | Takahashi et al. | ......................... | 248/363 |
| 2008/0048084 A1 | * | 2/2008 | Takahashi et al. | ......................... | 248/363 |
| 2008/0251664 A1 | * | 10/2008 | Hara et al. | ......................... | 248/205.8 |
| 2009/0027359 A1 | * | 1/2009 | Wong et al. | ......................... | 345/179 |
| 2009/0057510 A1 | * | 3/2009 | Orban | ......................... | 248/205.4 |

FOREIGN PATENT DOCUMENTS

| | | | |
|---|---|---|---|
| JP | 61-130608 | | 6/1986 |
| JP | 11-193811 | | 7/1999 |
| JP | 11257334 | * | 9/1999 |

* cited by examiner

*Primary Examiner* — Terrell Mckinnon
*Assistant Examiner* — Christopher Garft
(74) *Attorney, Agent, or Firm* — Oblon, Spivak, McClelland, Maier & Neustadt, L.L.P.

(57) ABSTRACT

Herein disclosed a suction cup including: a suction cup body having at least one surface having a gel, the surface being a suction surface; and an elastically deformable spring element provided in or on the suction cup body, having a concave shape so as to make the suction surface have a concave shape, and energizing a central part of the suction surface away from a surface to be sucked in the condition where the suction surface is in suction contact with the surface to be sucked, wherein the spring element is formed from a material having a modulus of elasticity higher than those of natural rubber and synthetic rubbers.

13 Claims, 10 Drawing Sheets

SUCTION CUP

CROSS REFERENCES TO RELATED APPLICATIONS

The present invention contains subject matter related to Japanese Patent Application JP 2006-230151 filed in the Japan Patent Office on Aug. 28, 2006, the entire contents of which being incorporated herein by reference.

BACKGROUND OF THE INVENTION

1. Field of the Invention

The present invention relates to a suction cup (sucker).

2. Description of the Related Art

Suction cups for attaching goods to, for example, a wall in a room or to a dashboard in an automobile have been known.

Ordinarily, this kind of suction cup is formed in a circular disk-like shape from a rubber or the like, and its surface on one side in the thickness direction thereof is made to be a suction surface to be put into suction contact with a surface to be sucked, while its surface on the other side is made to be a back surface.

In use of the suction cup, the suction surface is made to front on the surface to be sucked, a central part of the suction surface is pressed against the surface to be sucked, whereby a substantially vacuum condition is generate between the suction surface of the suction cup and the surface to be sucked, and the vacuum condition is maintained by the elasticity of the suction cup, so as to leave the suction cup in suction contact with the surface to be sucked (refer to Japanese Patent Laid-open No. Hei 11-193811 as Patent Document 1).

On the other hand, in the cases where the surface to be sucked is formed as a grained surface or is formed as a minutely rugged surface, a rough surface or the like, it may be impossible to maintain the adhesion (close contact) between the suction surface and the surface to be sucked, and a gap may be formed between the suction surface and the surface to be sucked. Thus, it is difficult to maintain the suction contact performance of the suction cup.

In order to solve this problem, the present applicant has proposed a suction cup capable of adhesion to a surface to be sucked even in the cases where the surface to be sucked is formed as a grained surface or is formed as a minutely rugged surface, a rough surface or the like, wherein the suction surface of the suction cup includes a gel layer (Japanese Patent Application No. 2006-116359).

SUMMARY OF THE INVENTION

Meanwhile, gels do not have elasticity, and it is difficult for a gel to keep its shape when used alone. In the above-mentioned suction cup using a gel layer, therefore, the gel layer is attached to an attaching surface of the suction cup which is formed of a rubber or the like.

Accordingly, the thickness of the gel layer is added to the original thickness of the suction cup, resulting in an increase in the size of the suction cup.

Thus, there is a need for a suction cup capable of adhesion to a surface to be sucked even in the cases where the surface to be sucked is formed as a grained surface or is formed as a minutely rugged surface, a rough surface or the like, while preventing the suction cup from being increased in size.

In order to meet the above need, according to an embodiment of the present invention, there is provided a suction cup including: a suction cup body having at least one surface having a gel, the surface being a suction surface; and an elastically deformable spring element provided in or on the suction cup body, having a concave shape so as to make the suction surface have a concave shape, and energizing a central part of the suction surface away from a surface to be sucked in the condition where the suction surface is in suction contact with the surface to be sucked, wherein the spring element is formed from a material having a modulus of elasticity higher than those of natural rubber and synthetic rubbers.

According to another embodiment of the present invention, there is provided a suction cup including: a suction cup body having at least one surface having a gel, the surface being a suction surface; and an elastically deformable spring element provided in or on the suction cup body, having a concave shape so as to make the suction surface have a concave shape, and energizing a central part of the suction surface away from a surface to be sucked in the condition where the suction surface is in suction contact with the surface to be sucked, wherein the spring element is embedded in the inside of the suction cup body.

According to a further embodiment of the present invention, there is provided a suction cup including: a suction cup body having at least one surface including a gel, the surface being a suction surface; and an elastically deformable spring element provided in or on the suction cup body, having a concave shape so as to make the suction surface have a concave shape, and energizing a central part of the suction surface away from a surface to be sucked in the condition where the suction surface is in suction contact with the surface to be sucked, wherein a surface on the other side in the thickness direction of the suction cup body is a convex back surface, the spring element is formed from a metal, a carbon material, or a fiber-reinforced plastic, and the spring element is attached to the back surface.

According to the present invention, the part inclusive of the suction surface is made by use of a gel. This ensures that the suction surface can be deformed following up to the ruggedness, if any, of the surface be sucked, not only in the cases where the surface to be sucked is a flat surface but also in the cases where the surface is formed as a grained surface or is formed as a minutely rugged surface, a rough surface or the like. Thus, the suction surface can be put into adhesion to (close contact with) the minutely rugged or rough surface, without generating any gap between the suction surface and the rugged or rough surface, so that the suction cup can be assuredly put in suction contact with the rugged or rough surface.

In addition, instead of adopting a structure in which a gel layer including a gel is laminated on a suction cup having a rubber or the like, a structure is adopted in which the suction cup body as a whole inclusive of the suction surface is formed by use of a gel and, simultaneously, the suction cup body is provided with a spring element so as thereby to maintain the shape of the suction cup and to impart elasticity to the suction cup. This makes it possible to configure the suction cup without increasing the size thereof, which is advantageous in contriving a suction cup with a smaller size.

DETAILED DESCRIPTION OF THE PREFERRED EMBODIMENTS

First Embodiment

Figure 1A:
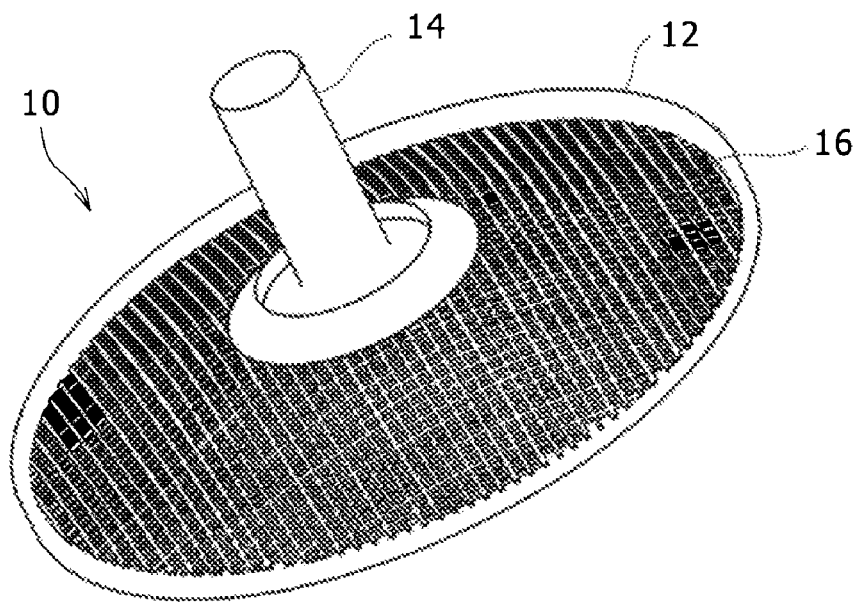
FIG. 1A is a perspective view of a suction cup 10 according to a first embodiment of the present invention.

Now, an embodiment of the present invention will be described below referring to the drawings.

Figure 1B:
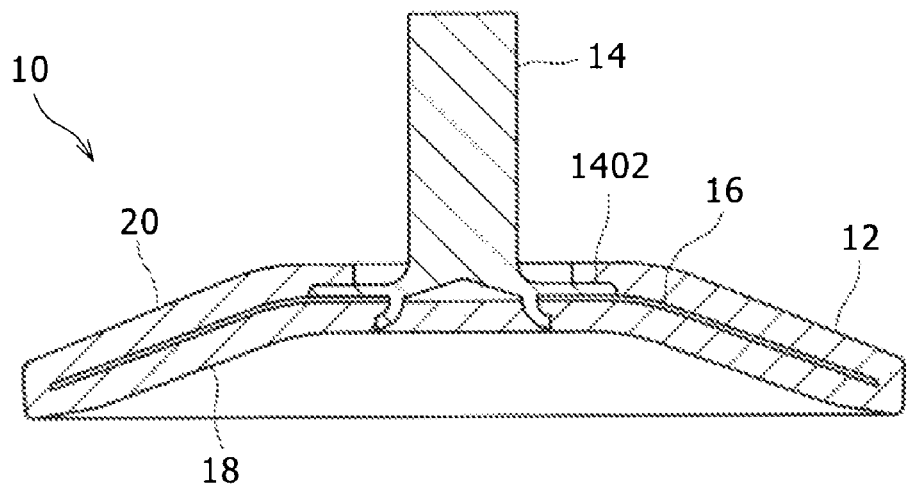
FIG. 1B is a sectional view of the same.
Figure 2A:
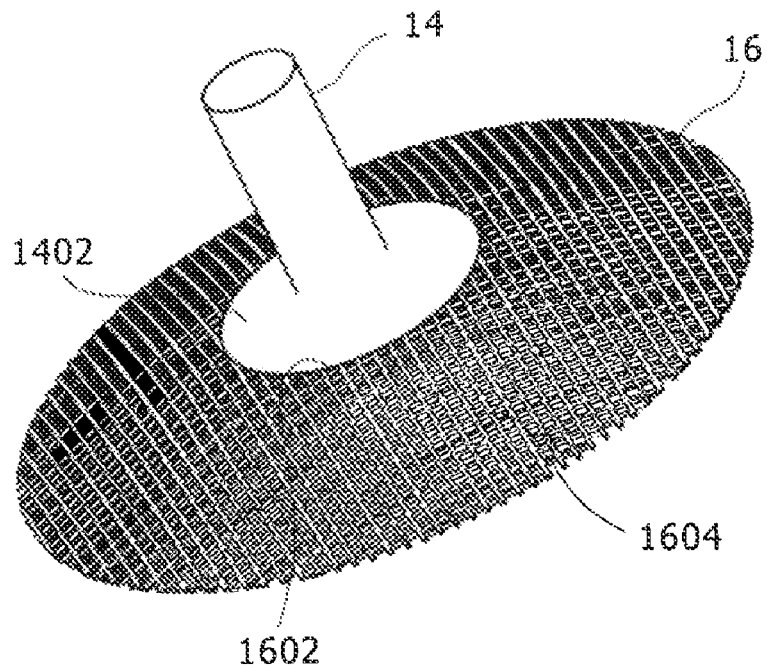
FIG. 2A is a perspective view of a spring element 16.
Figure 2B:
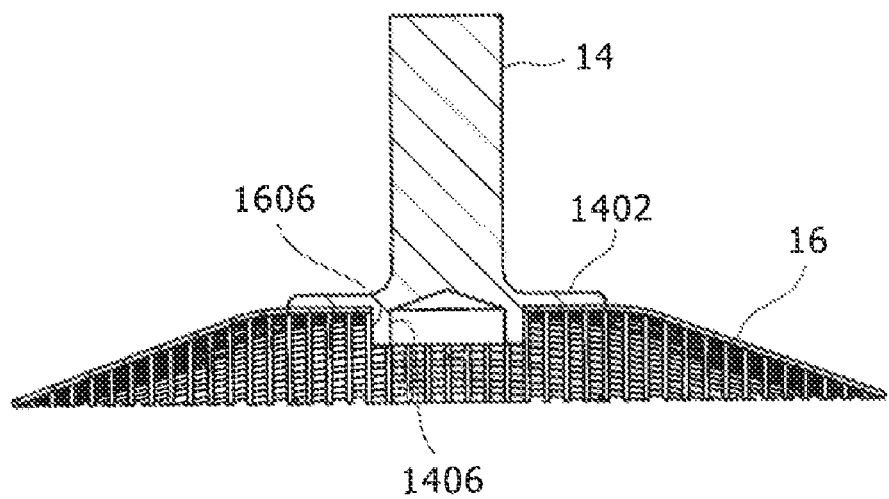
FIG. 2B is a sectional view of the spring element 16.

FIG. 1A is a perspective view of a suction cup 10 according to a first embodiment of the present invention, FIG. 1B is a sectional view of the same, FIG. 2A is a perspective view of a spring element 16, and FIG. 2B is a sectional view of the spring element 16.

The suction cup 10 shown in FIGS. 1A and 1B is for supporting, for example, a display panel of a car navigation unit or a television unit on a dashboard in a compartment of an automobile, or for supporting an accessory such as a controller for remote control of various on-vehicle apparatuses.

As shown in FIGS. 1A and 1B, the suction cup 10 according to the first embodiment includes a suction cup body 12, a center shaft 14, and a spring element 16.

The suction cup body 12 includes a gel. As shown in FIGS. 1A and 1B, the suction cup body 12 is plate-like in shape, specifically, circular disk-like in shape in this embodiment, and its surface on one side in the thickness direction is a concave suction surface 18 and its surface on the other side is a convex back surface 20.

Incidentally, since the gel does not have elasticity and it is difficult for the gel to keep its shape, the above-mentioned shape is maintained by the spring element 16 which will be described later.

Examples of the gel which can be used here include synthetic resin gels based on polyethylene, styrene, silicone resin or the like. An example of the polyethylene based gel is commercially available under the product name "COSMO GEL" from Cosmo Instruments Co., Ltd. An example of the styrene based gel is commercially available under the product name "NAGFLEX" from Inoac Corporation. An example of the silicone based gel is commercially available under the product name "αGEL" (alpha gel) from Geltec Co., Ltd.

Incidentally, though omitted in the figures, a piece for a detaching operation of the suction cup body 12, which extends outwards in a radial direction of the suction cup body 12, is provided at the peripheral edge of the suction cup body 12.

As shown in FIG. 1B, the center shaft 14 is projected from a central part of the back surface 20 of the suction cup body 12 along the center shaft 14 of the suction surface 18 and away from the back surface 20.

The center shaft 14 is formed from a metal or a hard synthetic resin. The center shaft 14 is provided at its lower end with a flange 1402, and the flange 1402 is embedded in a central part of the suction cup body 12.

The center shaft 14 is used for supporting, for example, a display panel of a car navigation unit or television unit on a dashboard in a compartment of an automobile, or for supporting, for example, a controller for remote control of various on-vehicle apparatuses.

The spring element 16 is formed in a concave shape for the purpose of maintaining the shape of the suction cup body 12, more specifically for the purpose of forming a concave suction surface 18.

The spring element 16 is elastically deformable, and is so formed as to energize a central part of the suction surface 18 away from a surface to be sucked in the condition where the suction surface 18 is in suction contact with the surface to be sucked.

As shown in FIGS. 2A and 2B, the spring element 16 includes a central part 1602 located at a central part of the suction cup body 12, and an annular part 1604 located at an annular part, other than the central part, of the suction cup body 12.

The spring element 16, in this embodiment, includes a net-like member having a configuration in which an elastic thin bar member is fabricated into a net-like form having a concave shape corresponding to the suction surface 18.

Examples of the material which can be used for the bar member for forming the spring element 16 include metals such as stainless steel. Or, alternately, the bar member may be formed from a non-metallic material such as carbon materials and fiber-reinforced plastics. These materials are higher in hardness and modulus of elasticity than the natural and synthetic rubbers having hitherto been used for forming suction cups. Therefore, when the spring member 16 for maintaining the suction cup body 12 in a concave shape and energizing a central part of the suction surface 18 away from a suction to be sucked in the condition where the suction surface 18 is in suction contact with the surface to be sucked is formed by use of one of the just-mentioned materials, the spring element 16 can be formed to be smaller in material thickness, with an advantage in contriving a reduction in the size of the suction cup 10, as compared with the case where the spring element is formed of one of the natural and synthetic rubbers which have been used to form suction cups in the related art.

The spring element 16 is embedded in the inside of the suction cup body 12, and the flange 1402 of the center shaft 14 and the spring element 16 are connected to each other.

In this embodiment, a hollow cylindrical wall 1406 is preliminarily formed at the lower surface of the flange 1402, and the spring element 16 is preliminarily provided in its center with a hole 1606 into which to insert the hollow cylindrical wall 1406. Then, as shown in FIG. 2B, the hollow cylindrical wall 1406 is inserted into the hole 1606. Thereafter, as shown in FIG. 1B, the hollow cylindrical wall 1406 is calked so as to connect the lower end of the center shaft 14 and the central part of the spring element 16.

Now, the operation and effects of this embodiment will be described below.

First, by holding the accessory and the center shaft 14, the suction surface 18 of the suction cup body 12 is made to face the surface to be sucked. Then, the suction cup body 12 is pressed against the surface to be sucked, and a substantially vacuum condition is formed between the suction surface 18 and the surface to be sucked, and the hand is put off the accessory.

When the hand is put off the accessory, the suction cup body 12 is left in suction contact with the surface to be sucked. In this condition, the central part of the suction cup body 12 tends to part from the surface to be sucked, due to the elasticity of the spring element 16, whereby the degree of adhesion (close contact) of the suction cup 10 to the surface to be sucked is enhanced, and the accessory is securely attached to the surface to be sucked.

Therefore, according to this embodiment, since the part inclusive of the suction surface 18 is formed by use of the gel, the suction surface 18 can be deformed following up to the ruggedness, if any, of the surface be sucked, not only in the cases where the surface to be sucked is a flat surface but also in the cases where the surface is formed as a grained surface or is formed as a minutely rugged surface, a rough surface or the like. Thus, the suction surface 18 can be put into adhesion to the minutely rugged or rough surface, without generating any gap between the suction surface 18 and the rugged or rough surface, so that the suction cup 10 can be assuredly put in suction contact with the rugged or rough surface. This is advantageous in securely attaching various goods to a surface to be sucked, such as a grained surface of a dashboard panel.

In addition, instead of adopting a structure in which a gel layer including a gel is laminated on a suction cup having a rubber or the like, a structure is adopted in which the suction cup body 12 as a whole inclusive of the suction surface 18 is formed by use of a gel and, simultaneously, the suction cup body 12 is provided with the spring element 16 so as thereby to maintain the shape of the suction cup 10 and to impart elasticity to the suction cup 10. This makes it possible to configure the suction cup 10 without increasing the material thickness thereof, or the size thereof, which is advantageous in contriving a suction cup 10 with a smaller size.

Second Embodiment

Now, a second embodiment of the present invention will be described below.

Figure 3C:
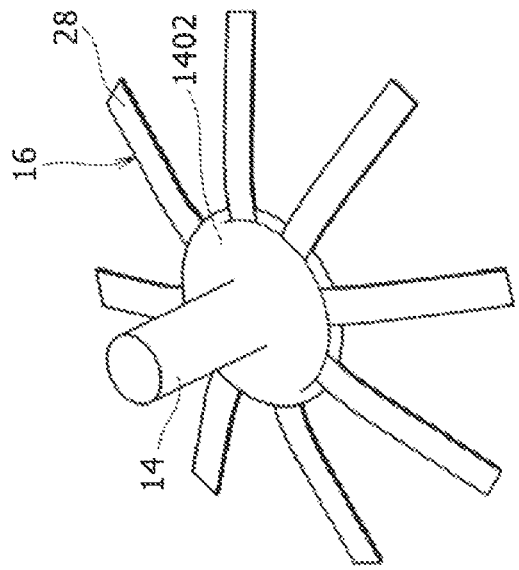
FIG. 3C is a perspective view of a spring element 16 according to a fourth embodiment of the invention.
Figure 3A:
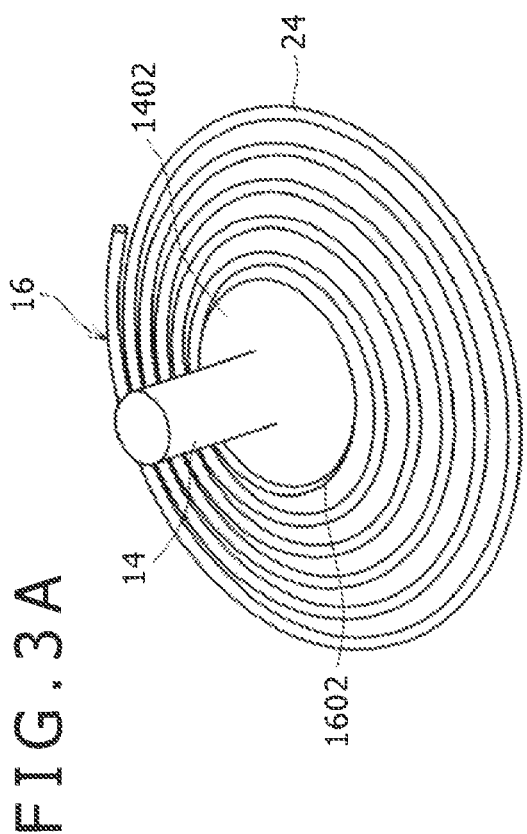
FIG. 3A is a perspective view of a spring element 16 according to a second embodiment of the present invention.

FIG. 3A is a perspective view of a spring element 16 according to the second embodiment.

As shown in FIG. 3A, the spring element 16 according to the second embodiment has a configuration in which an elastic thin bar member 24 is spirally wound along a concave shape corresponding to a suction surface 18. The material forming the bar member 24 is the same as in the first embodiment above.

The method of using the spring element 16 is the same as in the first embodiment. A central part 1602 of the spring element 16 is connected to a flange 1402 provided at the lower end of a center shaft 14, and is embedded in the inside of a suction cup body 12 together with the lower end of the center shaft 14.

According to a suction cup 10 using the spring element 16 of the second embodiment thus configured, also, the same effects as in the first embodiment are obtained.

Third Embodiment

Now, a third embodiment of the present invention will be described below.

Figure 3B:
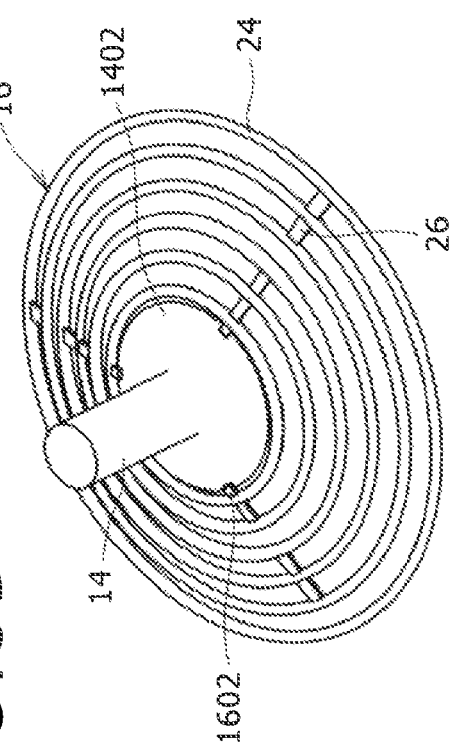
FIG. 3B is a perspective view of a spring element 16 according to a third embodiment of the invention.

FIG. 3B is a perspective view of a spring element 16 according to the third embodiment.

As shown in FIG. 3B, the spring element 16 in the third embodiment has a configuration in which an elastic thin bar member 24 is spirally wound along a concave shape corresponding to a suction surface 18, and, further, parts of the bar member 24 are connected by a plurality of thin bar members 26 extending in radial directions from a central part 1602 of the spring element 16.

The method of using the spring element 16 is the same as in the first embodiment above. A central part of the spring element 16 and the inner end of the bar member 24 are connected to a flange 1402 provided at the lower end of a center shaft 14, and the spring element 16 is embedded in the inside of a suction cup body 12 together with the lower end of the center shaft 14.

According to the suction cup 10 using the spring element 16 of the third embodiment thus configured, also, the same effects as in the first embodiment are obtained.

Fourth Embodiment

Now, a fourth embodiment of the present invention will be described below.

FIG. 3C is a perspective view of a spring element 16 according to the fourth embodiment.

As shown in FIG. 3C, the spring element 16 in the fourth embodiment includes a plurality of mutually separated pieces 28 each having an elastic thin plate member and extending radially from a central part of a suction cup body 12 toward the periphery of the suction cup body 12.

Examples of the material constituting the elastic plate member includes metals such as stainless steel. Or, alternately, the elastic thin plate member may be formed from a non-metallic material such as carbon materials and fiber-reinforced plastics.

The parts, located at a central part of the suction cup body 12, of the plurality of pieces 28 are connected to a flange 1402 provided at the lower end of a center shaft 14.

The method of using the spring element 16 is the same as in the first embodiment above. The spring element 16 is embedded in the inside of the suction cup body 12 together with the lower end of the center shaft 14.

According to a suction cup 10 using the spring element 16 of the fourth embodiment thus configured, also, the same effects as in the first embodiment are obtained.

Fifth Embodiment

Now, a fifth embodiment of the present invention will be described below.

Figure 4A:
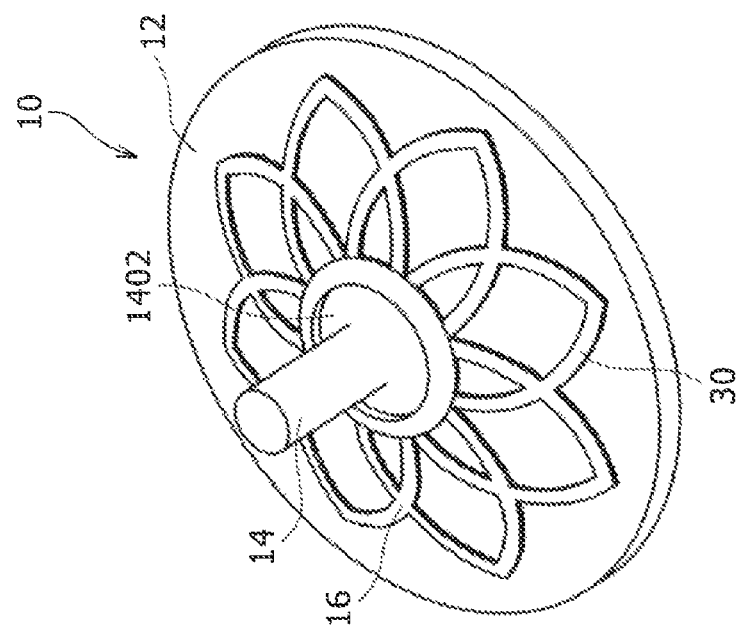
FIG. 4A is a perspective view of a suction cup 10 according to a fifth embodiment of the present invention.
Figure 4B:
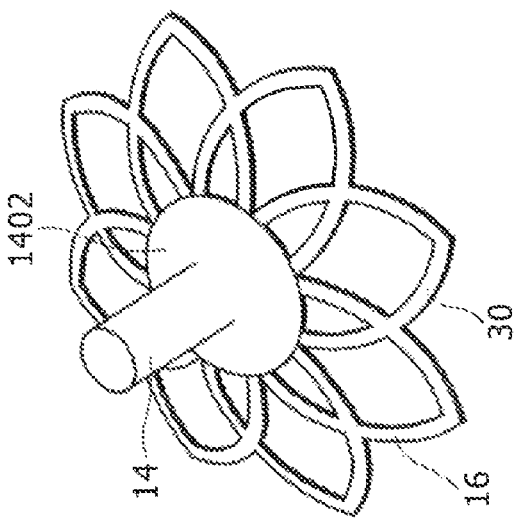
FIG. 4B is a perspective view of a spring element 16 according to the fifth embodiment.
Figure 4C:
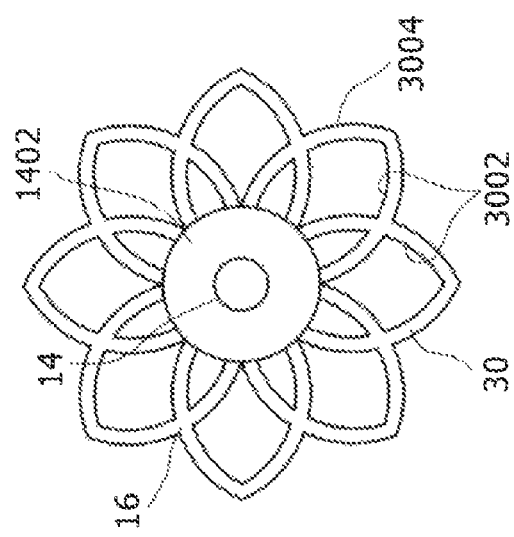
FIG. 4C is a plan view of the spring element 16 according to the fifth embodiment.

FIG. 4A is a perspective view of a suction cup 10 according to the fifth embodiment, FIG. 4B is a perspective view of a spring element 16 according to the fifth embodiment, and FIG. 4C is a plan view of the spring element 16 according to the fifth embodiment.

The spring element 16 has a piece 30 formed from an elastic thin plate member and extending in a concave shape along the shape of a suction surface 18. The material constituting the plate member is the same as in the fourth embodiment above.

The piece 30 includes a plurality of openings 3002, and small-width strips 3004 fringing the openings 3002. The piece 30 as a whole has a shape as if modeled after a flower in plan view.

The parts, located at a central part of a suction cup body 12, of the piece 30 are connected to a flange 1402 provided at the lower end of a center shaft 14.

The method of using the spring element 16 is the same as in the first embodiment above. The spring element 16 is embedded in the inside of the suction cup body 12 together with the lower end of the center shaft 14.

According to the suction cup 10 using the spring element 16 of the fifth embodiment thus configured, also, the same effects as in the first embodiment are obtained.

Further, in this embodiment, when the suction cup body 12 is formed from a transparent elastic material, the shape of the spring element 16 can be visually recognized, which is advantageous in enhancing the aesthetic property of the suction cup 10. In this case, coloring the spring element 16 in, for example, red, yellow, green or the like is further advantageous in enhancing the aesthetic property of the suction cup 10.

Sixth Embodiment

Now, a sixth embodiment of the present invention will be described below.

Figure 5A:
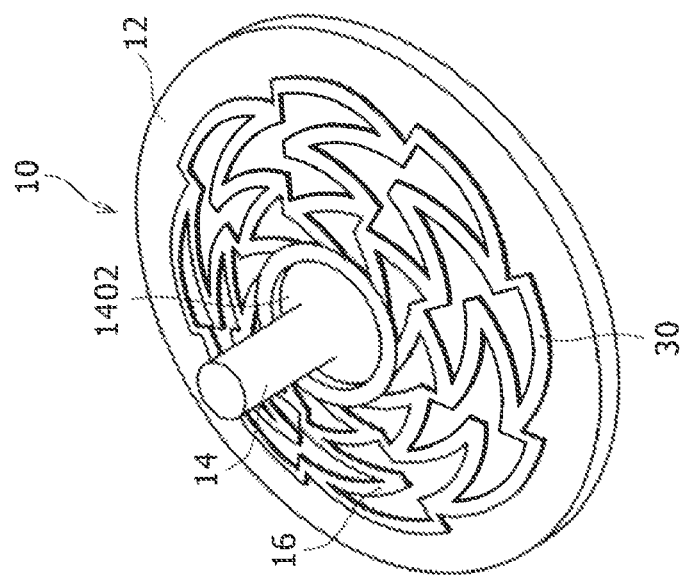
FIG. 5A is a perspective view of a suction cup 10 according to a sixth embodiment of the present invention.
Figure 5B:
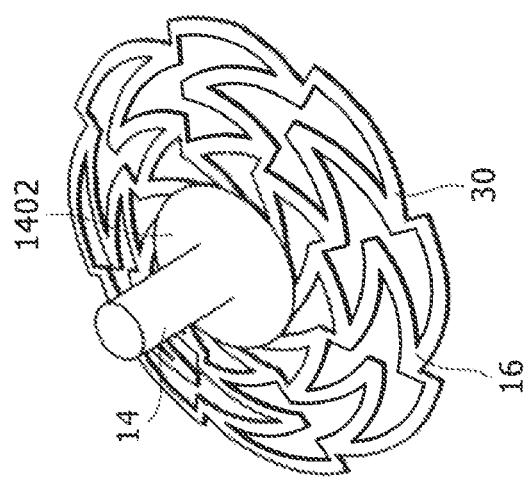
FIG. 5B is a perspective view of a spring element 16 according to the sixth embodiment.
Figure 5C:
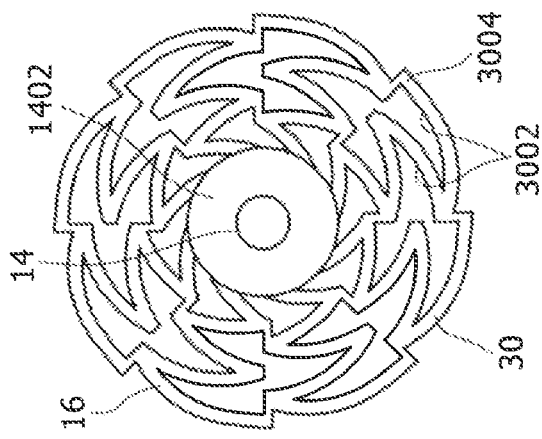
FIG. 5C is a plan view of the spring element 16 according to the sixth embodiment.

FIG. 5A is a perspective view of a suction cup 10 according to the sixth embodiment, FIG. 5B is a perspective view of a spring element according to the sixth embodiment, and FIG. 5C is a plan view of the spring element 16 according to the sixth embodiment.

The spring element 16 has a piece 30 including an elastic thin plate member and extending in a concave shape along the shape of a suction surface 18. The material forming the plate member is the same as in the fourth embodiment above.

The piece 30 includes a plurality of openings 3002, and small-width strips 3004 fringing the openings 3002. The piece 30 as a whole has a shape as if modeled after a geometric pattern in plan view.

The parts, located at a central part of a suction cup body 12, of the piece 30 are connected to a flange 1402 provided at the lower end of a center shaft 14.

The method of using the spring element 16 is the same as in the first embodiment above. The spring element 16 is embedded in the inside of the suction cup body 12 together with the lower end of the center shaft 14.

According to the suction cup 10 using the spring element 16 of the sixth embodiment thus configured, also, the same effects as in the first embodiment are obtained.

In addition, also in this embodiment, like in the fifth embodiment above, when the suction cup body 12 is formed from a transparent elastic material, the spring element 16 can be visually recognized, which is advantageous in enhancing the aesthetic property of the suction cup 10. In this case, coloring the spring element 16 in, for example, red, yellow, green or the like is more advantageous in enhancing the aesthetic property of the suction cup 10.

Seventh Embodiment

Now, a seventh embodiment of the present invention will be described below.

Figure 6:
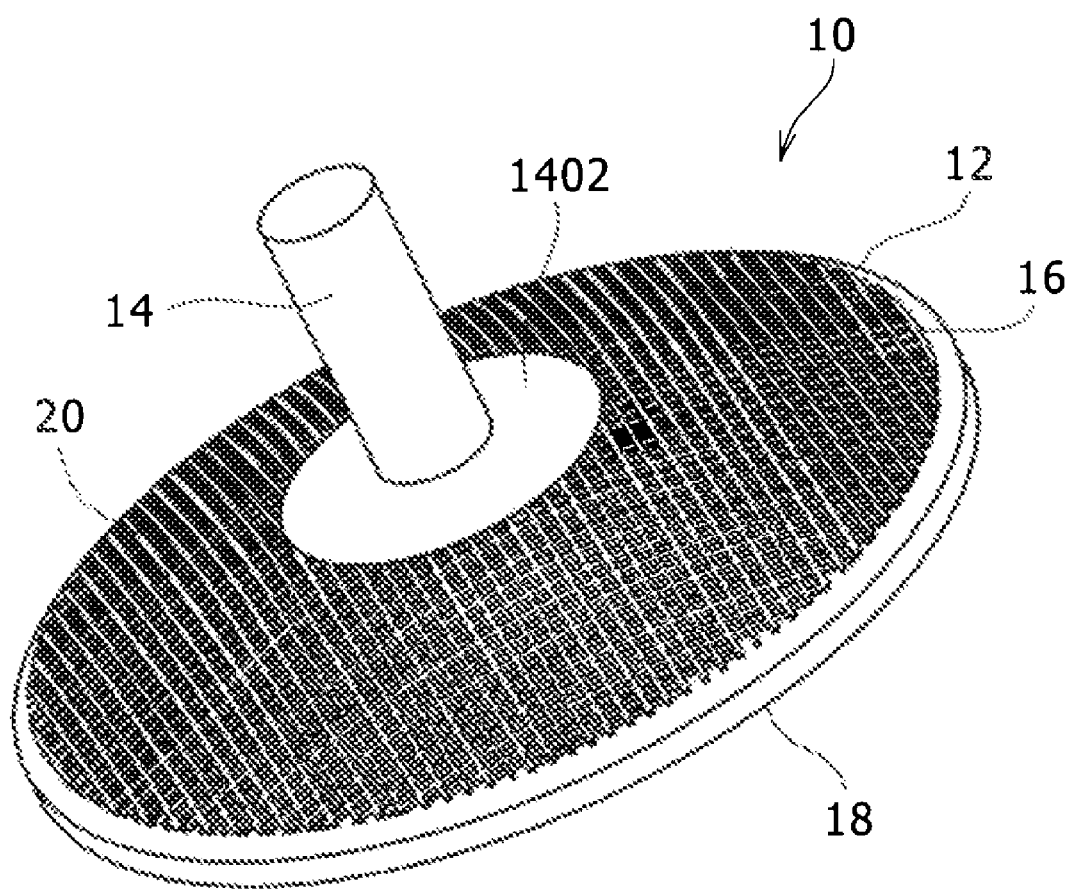
FIG. 6 is a perspective view of a suction cup 10 according to a seventh embodiment of the present invention.

FIG. 6 is a perspective view of a suction cup 10 according to the seventh embodiment.

A spring element 16 shown in FIG. 6 has the same configuration as in the first embodiment above. Specifically, a flange 1402 provided at the lower end of a center shaft 14 and the spring element 16 including a net-like member are attached to a back surface 20 of a suction cup body 12.

According to the suction cup 10 using the spring element 16 of the seventh embodiment thus configured, also, the same effects as in the first embodiment above are obtained.

Incidentally, in the present invention, the expression "the spring element 16 is attached to the back surface 20 of the suction cup body 12" includes both the case where the spring element 16 is mounted to the surface of the back surface 20 of the suction cup body 12 and the case where the spring element 16 is embedded in the back surface 20 of the suction cup body 12.

Eighth Embodiment

Now, an eighth embodiment of the present invention will be described below.

Figure 7A:
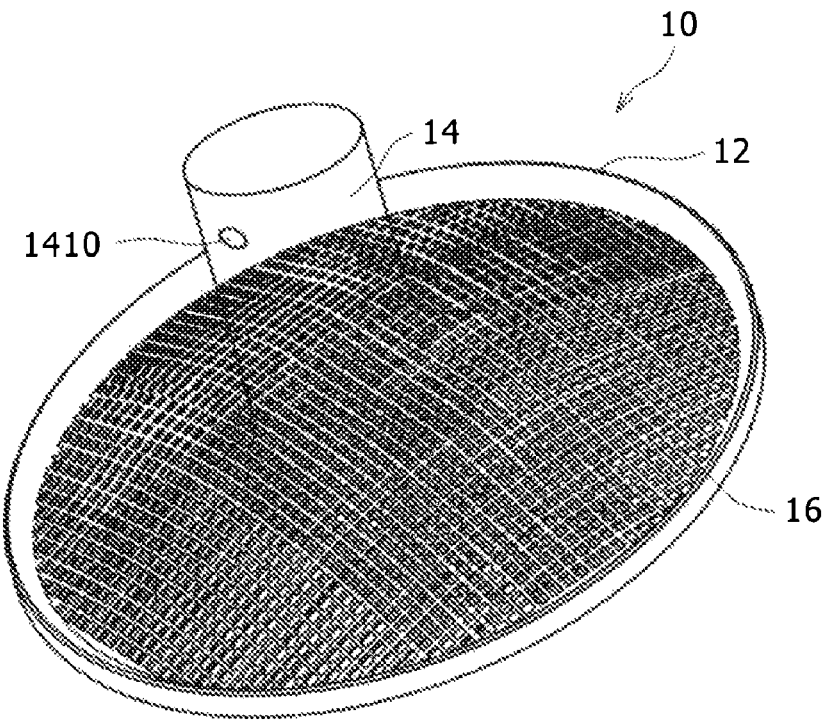
FIG. 7A is a perspective view of a suction cup 10 according to an eighth embodiment of the present invention.
Figure 7B:
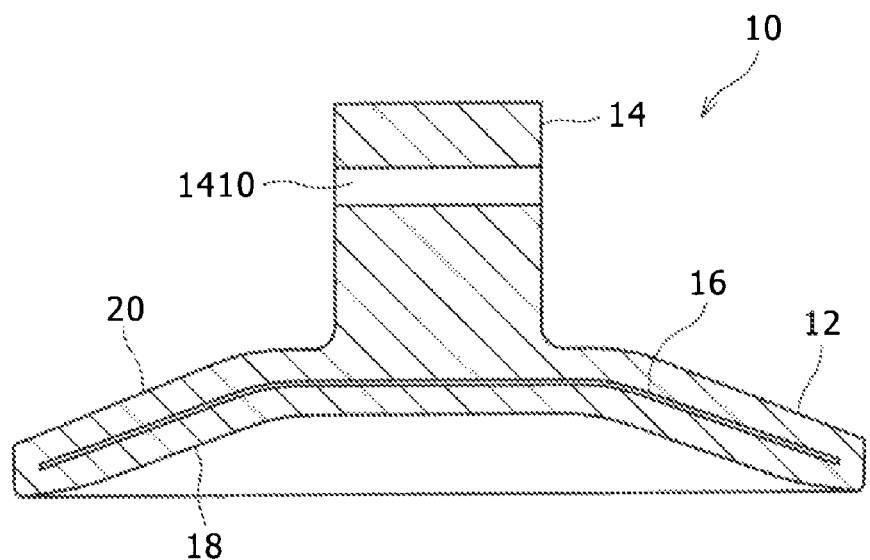
FIG. 7B is a sectional front view of the suction cup 10 according to the eighth embodiment.

FIG. 7A is a perspective view of a suction cup 10 according to the eighth embodiment, and FIG. 7B is a sectional front view of the suction cup 10 according to the eighth embodiment.

The eighth to twelfth embodiments differ from the first to seventh embodiments above in that a center shaft 14 is formed as one body with a suction cup body 12.

More specifically, the center shaft 14 is projected from a central part of a back surface 20 of the suction cup body 12 along the center shaft of a suction surface 18 and away from the back surface 20.

The center shaft 14 and the suction cup body 12 are integrally molded from the same material.

The center shaft 14 is provided therein with a hole 1410, and, for example, various goods may be supported through a strap or the like passed through the hole 1410.

Like in the seventh embodiment, the spring element 16 in this embodiment includes a net-like member obtained by fabricating an elastic thin bar member into a net-like form having a concave shape corresponding to the suction surface 18.

The spring element 16 is embedded in the inside of the suction cup body 12.

According to the suction cup 10 using the spring element 16 of the eighth embodiment thus configured, also, the same effects as in the first embodiment above are obtained.

Ninth Embodiment

Now, a ninth embodiment of the present invention will be described below.

Figure 8A:
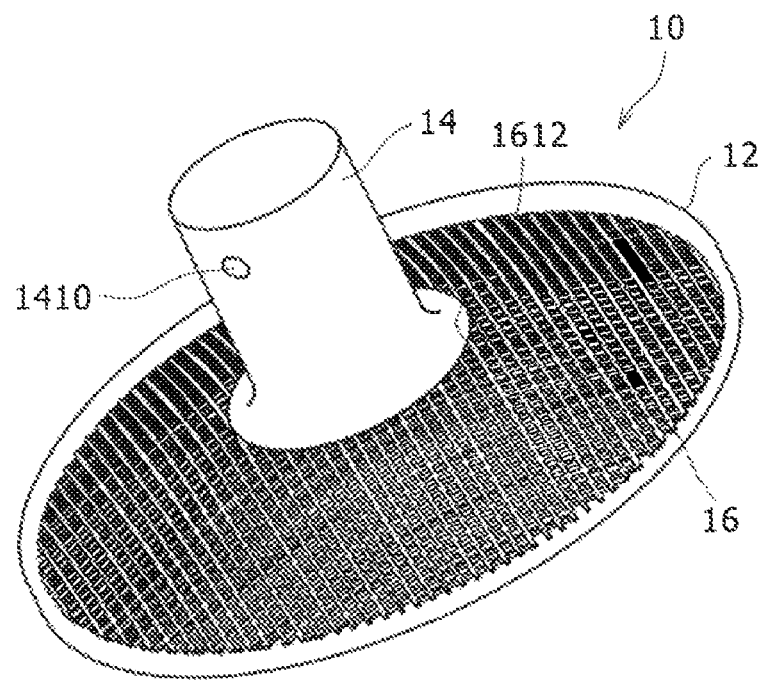
FIG. 8A is a perspective view of a suction cup 10 according to a ninth embodiment of the present invention.
Figure 8B:
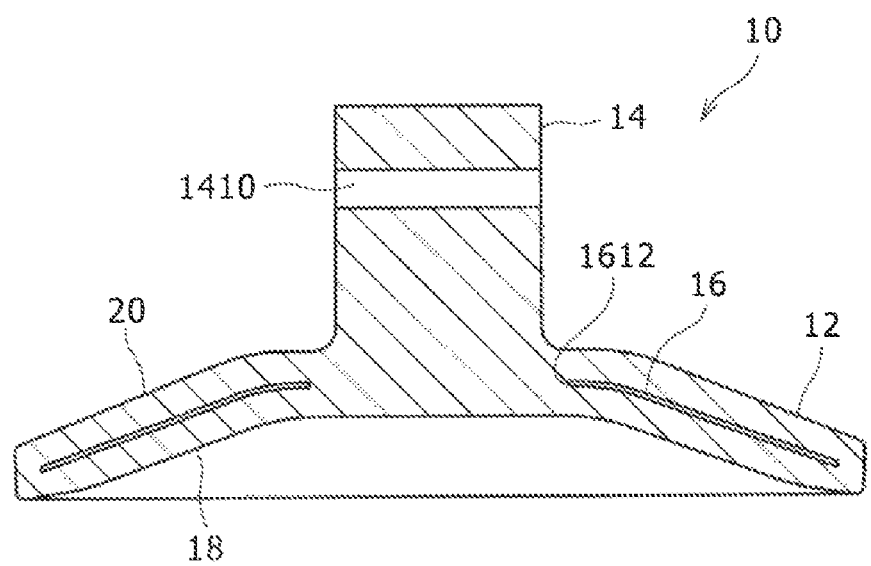
FIG. 8B is a sectional front view of the suction cup 10 according to the ninth embodiment.

FIG. 8A is a perspective view of a suction cup 10 according to the ninth embodiment, and FIG. 8B is a sectional front view of the suction cup 10 according to the ninth embodiment.

The ninth embodiment has a configuration in which the spring element 16 in the eighth embodiment above is provided in its central part with a hole 1612 sized to be greater than the diameter of the center shaft 14.

Therefore, in the ninth embodiment, the spring element 16 is located at an annular part, other than a central part, of the suction cup body 12.

According to the suction cup 10 using the spring element 16 of the ninth embodiment thus configured, also, the same effects as in the first embodiment are obtained.

Tenth Embodiment

Now, a tenth embodiment of the present invention will be described below.

Figure 9A:
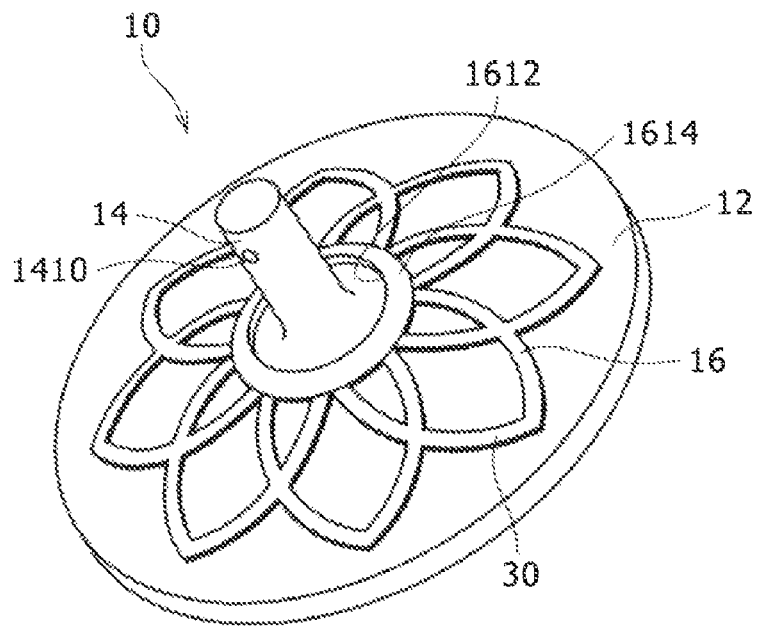
FIG. 9A is a perspective view of a suction cup 10 according to a tenth embodiment of the present invention.
Figure 9B:
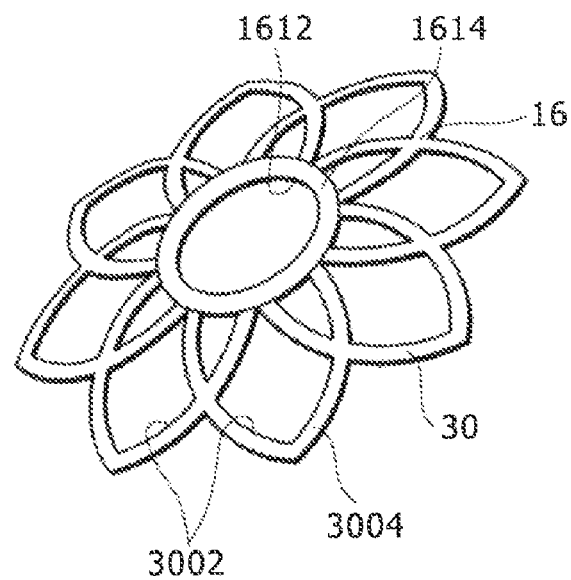
FIG. 9B is a perspective view of a spring element 16 according to the tenth embodiment.

FIG. 9A is a perspective view of a suction cup 10 according to the tenth embodiment, and FIG. 9B is a perspective view of a spring element 16 according to the tenth embodiment.

The configuration of a suction cup body 12 is the same as in the ninth embodiment above, but the configuration of the spring element 16 is different from that in the ninth embodiment.

More specifically, the spring element 16 has a piece 30 including an elastic thin plate member and extending in a concave shape along the shape of a suction surface 18. The material constituting the plate member is the same as in the fourth embodiment above.

The spring element 16 is provided in its central part with a hole 1612 sized to be larger than the diameter of a center shaft 14.

The spring element 16 has an annular plate part 1614 surrounding the hole 1612, and a part connected to the annular plate part 1614 and located at an annular part, other than a central part, of the suction cup body 12.

The part, located at the annular part of the suction cup body 12, of the spring element 16 includes a plurality of openings 3002, and small-width strips 3004 fringing the openings 3002, and has a shape as if modeled after a flower in plan view.

The spring element 16 is embedded in the inside of the suction cup body 12.

According to the suction cup 10 using the spring element 16 of the tenth embodiment thus configured, also, the same effects as in the first embodiment above are obtained.

Furthermore, in this embodiment, like in the fifth and sixth embodiments, when the suction cup body 12 is formed from a transparent elastic material, the shape of the spring element 16 can be visually recognized, which is advantageous in enhancing the aesthetic property of the suction cup 10. In this case, coloring the spring element 16 in, for example, red, yellow, green or the like is further advantageous in enhancing the aesthetic property of the suction cup 10.

Eleventh Embodiment

Now, an eleventh embodiment of the present invention will be described below.

Figure 10A:
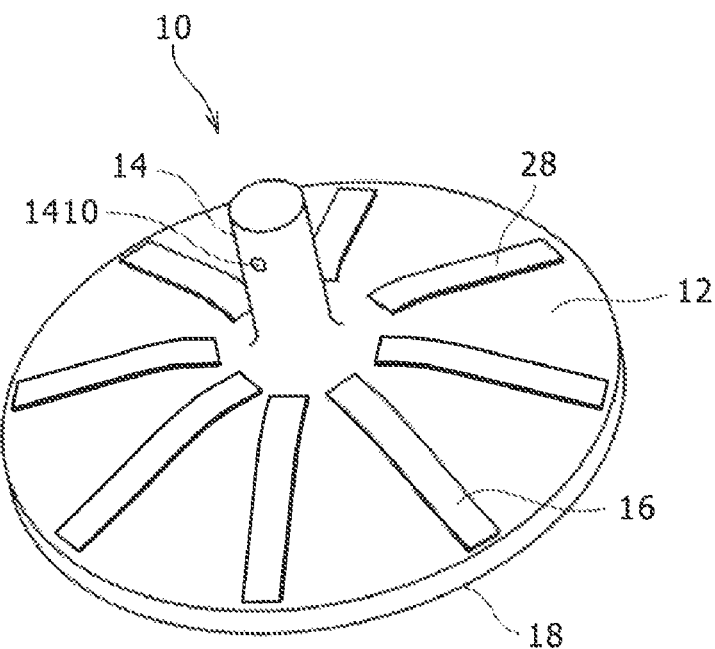
FIG. 10A is a perspective view of a suction cup 10 according to an eleventh embodiment of the present invention.

FIG. 10A is a perspective view of a suction cup 10 according to the eleventh embodiment.

The configuration of a suction cup body 12 is the same as in the tenth embodiment above, but the configuration of a spring element 16 is different from that in the tenth embodiment.

The spring element 16 has a plurality of mutually separated pieces 28 each including an elastic thin plate member and extending radially from a central part of the suction cup body 12 toward the periphery of the suction cup body 12. The material of the plate member is the same as in the fourth embodiment above.

The plurality of pieces 28 are embedded in the inside of the suction cup body 12.

According to the suction cup 10 using the spring element 16 of the eleventh embodiment, also, the same effects as in the first embodiment above are obtained.

Twelfth Embodiment

Now, a twelfth embodiment of the present invention will be described below.

Figure 10B:
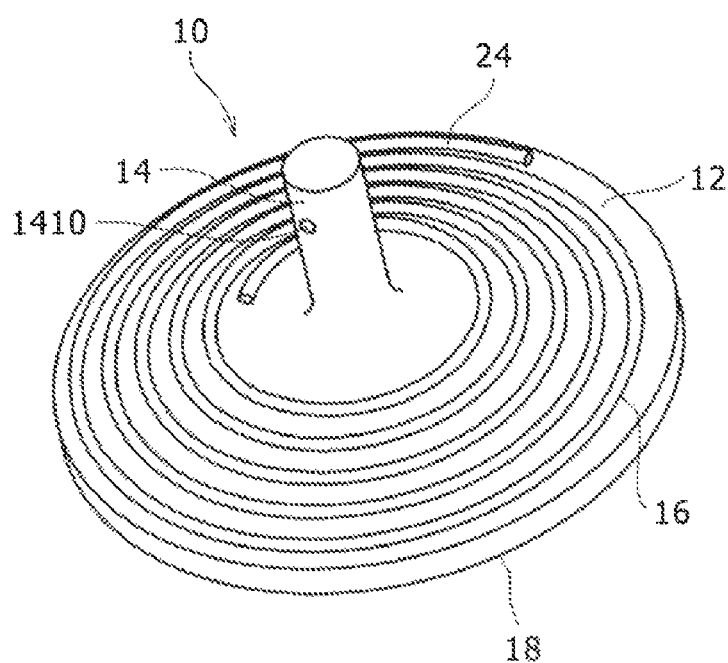
FIG. 10B is a perspective view of a suction cup 10 according to a twelfth embodiment of the present invention.

FIG. 10B is a perspective view of a suction cup 10 according to the twelfth embodiment.

The configuration of a suction cup body 12 is the same as in the eleventh embodiment, but the configuration of a spring element 16 is different from that in the eleventh embodiment.

The spring element 16 in the twelfth embodiment has a configuration in which an elastic thin bar member 24 is wound spirally along a concave shape corresponding to a suction surface 18. The spring element 16 is embedded in an annular part, other than a central part, of the suction cup body 12. The material constituting the bar member 24 is the same as in the first embodiment.

According to the suction cup 10 using the spring element 16 of the twelfth embodiment thus configured, also, the same effects as in the first embodiment above are obtained.

Incidentally, since the suction cup body 12 is formed by use of a gel and it suffices that the suction surface 18 of the suction cup 10 is put into suction contact with the surface to be sucked, the shape of the back surface of the suction cup body 12 is not limited to the convex shape adopted in the above embodiments, and may be a desired shape.

It should be understood by those skilled in the art that various modifications, combinations, sub-combinations and alterations may occur depending on design requirements and other factors insofar as they are within the scope of the appended claims or the equivalences thereof.

What is claimed is:

1. A suction cup, comprising:
a suction cup body including at least one integrated surface formed of synthetic resin gel, said at least one integrated surface being a suction surface; and
an elastically deformable spring element provided in or on said suction cup body, having a concave shape so as to make said suction surface have a concave shape, and energizing a central part of said suction surface in a direction away from a surface to be sucked when said suction surface is in suction contact with said surface to be sucked,
wherein said spring element is formed from a material having a modulus of elasticity higher than a modulus of elasticity of natural rubber and moduli of elasticity of synthetic rubbers,
wherein said spring element includes a net member, the net member being an elastic thin bar member having a concave shape corresponding to said suction surface, and
wherein the net member includes a first set of fibers and a second set of fibers, each fiber of the first set of fibers being substantially parallel to and separated by multiples of a first distance from each other, each fiber of the second set of fibers being substantially parallel to and separated by multiples of a second distance from each other, each fiber of the first set of fibers being attached to at least one of the fibers of the second set of fibers, and each fiber of the second set of fibers is attached to at least one fiber of the first set of fibers.

2. The suction cup as set forth in claim 1, wherein said spring element has a central part located at a central part of said suction cup body, and an annular part located at an annular part, other than said central part, of said suction cup body.

3. The suction cup as set forth in claim 1, wherein said spring element has a piece including an elastic thin bar member and extending along a concave shape corresponding to said suction surface; and said piece has a plurality of openings, and a small-width strip fringing said openings.

4. The suction cup as set forth in claim 1, wherein said spring element is embedded in an inside of said suction cup body.

5. The suction cup as set forth in claim 1, wherein a surface on the other side in the thickness direction of said suction cup body is a convex back surface; and said spring element is attached to said back surface.

6. The suction cup as set forth in claim 1, wherein a surface on an other side from the suction surface in a thickness direction of said suction cup body is a convex back surface; and
a center shaft including a hard synthetic resin or a metal is projected from a central part of said convex back surface of said suction cup body along the central part of said suction surface and away from said convex back surface.

7. The suction cup as set forth in claim 6, wherein a base end of said center shaft is embedded within said suction cup body;
said spring element is embedded within said suction cup body; and
said base end of said center shaft and said spring element are connected to each other.

8. The suction cup as set forth in claim 6, wherein the base end of said center shaft is connected to said spring element; and said base end of said center shaft and said spring element are attached to said back surface of said suction cup body.

9. The suction cup as set forth in claim 6, wherein said center shaft and said suction cup body are formed as one body from the same material.

10. The suction cup as set forth in claim 1, wherein said spring element is formed from a carbon material or a fiber-reinforced plastic.

11. The suction cup as set forth in claim 1, wherein said gel is transparent.

12. The suction cup as set forth in claim 11, wherein said spring element is colored.

13. The suction cup as set forth in claim 1, wherein the suction cup body is formed entirely of a synthetic resin gel.

* * * * *